United States Patent
Paul et al.

(10) Patent No.: US 6,815,006 B2
(45) Date of Patent: Nov. 9, 2004

(54) METHODS FOR MAKING CERAMIC MATRIX COMPOSITES USING PRECURSOR POLYMERS TO REFRACTORY METAL CARBIDES AND METAL BORIDES

(75) Inventors: Partha P. Paul, Alpharetta, GA (US); Stuart T. Schwab, Albuquerque, NM (US)

(73) Assignee: Southwest Research Institute, San Antonio, TX (US)

(*) Notice: Subject to any disclaimer, the term of this patent is extended or adjusted under 35 U.S.C. 154(b) by 130 days.

(21) Appl. No.: 10/106,750

(22) Filed: Mar. 26, 2002

(65) Prior Publication Data

US 2002/0098291 A1 Jul. 25, 2002

(Under 37 CFR 1.47)

Related U.S. Application Data

(63) Continuation of application No. 09/410,707, filed on Oct. 1, 1999, now Pat. No. 6,395,840, which is a continuation-in-part of application No. 08/943,855, filed on Oct. 3, 1997, now abandoned.

(51) Int. Cl.[7] .................................................. B05D 3/02
(52) U.S. Cl. ........................ 427/226; 427/227; 427/228; 427/394
(58) Field of Search ................................ 427/226, 227, 427/228, 394

(56) References Cited

U.S. PATENT DOCUMENTS

| 4,474,703 A | 10/1984 | Bujadoux et al. |
| 4,906,493 A | 3/1990 | Laine |
| 5,017,525 A | 5/1991 | Birchall et al. |
| 5,026,809 A | 6/1991 | Dietmar et al. |
| 5,059,701 A | 10/1991 | Keipert |
| 5,162,136 A | 11/1992 | Blum et al. |
| 5,256,487 A | 10/1993 | Myers |
| 5,837,364 A | * 11/1998 | Zank ........................ 428/312.6 |
| 5,844,052 A | 12/1998 | Keller et al. |
| 6,042,883 A | 3/2000 | Paul et al. |
| 6,120,840 A | * 9/2000 | Paul et al. .................. 427/226 |

FOREIGN PATENT DOCUMENTS

| DE | 1948988 | 9/1969 |
| EP | 0778291 A1 | 11/1997 |

OTHER PUBLICATIONS

Baldus et al Angew. Chem., Int. Ed. Engl, 36(4), 328–343, 1997.

J.R. Strife, et al. ,Status of Continuous Fiber–Reinforced Ceramic Matrix Composite Processing Technology, Ceram. Eng. Sci. Proc. 11[7–8] pp. 871–919 (1990).

* cited by examiner

*Primary Examiner*—Jeffrey Mullis
(74) *Attorney, Agent, or Firm*—The Morris Law Firm, P.C.

(57) ABSTRACT

The present invention provides a method for making a ceramic matrix composite comprising forming an infiltrated fiber reinforcement by infiltrating a plurality of plies of a fibrous material with a precursor polymer which decomposes to a substantially pure product selected from the group consisting of a refractory metal carbide and a refractory metal boride, and exposing the infiltrated fiber reinforcement to conditions effective to cure the precursor polymer and to decompose the precursor polymer to said substantially pure product.

40 Claims, No Drawings

METHODS FOR MAKING CERAMIC MATRIX COMPOSITES USING PRECURSOR POLYMERS TO REFRACTORY METAL CARBIDES AND METAL BORIDES

The present application is a continuation of application Ser. No. 09/410,707, filed Oct. 1, 1999, now U.S. Pat. No. 6,395,840 which is a continuation-in-part of application Ser. No. 08/943,855, filed Oct. 3, 1997, abandoned. Related applications include application Ser. No. 08/943,949, filed Oct. 3, 1997, issued as U.S. Pat. No. 6,042,883 on Mar. 28, 2000; application Ser. No. 09/535,567, filed Mar. 27, 2000, pending; application Ser. No. 08/942,964, filed Oct. 3, 1997, issued as U.S. Pat. No. 6,120,840 on Sep. 19, 2000; and, application Ser. No. 09/588,893, abandoned.

FIELD OF THE INVENTION

The present invention relates to the formation of ceramic matrix composites using precursor polymers which, upon pyrolysis or other energetic treatment, decompose to yield substantially pure refractory metal carbides and/or refractory metal borides.

BACKGROUND OF THE INVENTION

Considerable effort has been devoted over the past 15 years to the development of effective methods for manufacturing ceramic matrix composites (CMC's). Several approaches with potential for industrial use have been identified. The development of CMC's with high temperature stability theoretically is possible; however, CMC's have not yet been developed for use in extremely high temperature applications, such as multistage nozzles for rocket motors. Such nozzles must be capable of exhibiting high strength even after repeatedly withstanding temperatures of 1600° C. and even higher.

Currently, multistage nozzles are made from tungsten and graphite, which have relatively high melting/sublimation points—a 3410° C. melting point for tungsten, and a 3650° C. sublimation point for graphite. The high temperature strength of a material is proportional to the melting point of that material. If CMC's could be made using materials with higher melting/sublimation points than tungsten and graphite, then the resulting CMC's should be effective alternative materials for making high temperature components, such as multistage nozzles.

Certain metal carbides and metal borides have melting temperatures even higher than the melting/sublimation points of tungsten and graphite. For example, hafnium carbide has a melting temperature of 3890° C. and tantalum carbide has a melting temperature of 3880° C. Metal carbides also exhibit desirable brittle to ductile transition temperatures in the range of 1725–1980° C.

A CMC having a matrix of a refractory metal carbide and/or metal boride and comprising between about 20–30% particulate silicon carbide theoretically would be an ideal alternative for tungsten and graphite in multistage nozzles. Such metal carbides and/or metal borides also might be useful as high temperature coatings for other surfaces which are exposed to high temperatures during operation. In fact, the United States Air Force has recently initiated a new program—Integrated High Pay-Off Rocket Propulsion Technology (IHPRPT)—to incorporate such advanced materials into rocket and space propulsion systems.

Unfortunately, the most widely used method for making CMC's—chemical vapor infiltration (CVI)—is slow, complex, and has many inherent difficulties. One major difficulty for high temperature applications is that CVI produces a CMC with substantial residual porosity (15–25%). The greater the porosity, the lower the strength of the CMC.

Polymer infiltration/pyrolysis (PIP) can produce a less porous CMC. However, PIP can only be used to make metal carbide/metal boride CMC's if precursor polymers are developed which will decompose upon pyrolysis or other energy treatment to yield substantially pure metal carbides and metal borides.

SUMMARY OF THE INVENTION

The present invention provides a method for making a ceramic matrix composite comprising forming an infiltrated fiber reinforcement by infiltrating a plurality of plies of a fibrous material with a precursor polymer which decomposes to a substantially pure product selected from the group consisting of a refractory metal carbide and a refractory metal boride, and exposing the infiltrated fiber reinforcement to conditions effective to cure the precursor polymer and to decompose the precursor polymer to said substantially pure product.

DETAILED DESCRIPTION OF THE INVENTION

Synthetic inorganic and organometallic chemistry has been used to produce a variety of metal-containing polymer species which, upon pyrolysis or other energetic treatment, decompose to yield substantially pure metal carbides and/or metal borides. Two different approaches were used to obtain such organometallic precursor polymers.

Polymerization of Unsaturated Precursors

In a first embodiment, a transition metal salt is mixed with one or more organometallic(s) containing at least one unsaturated carbon-carbon bond to form organo-transition metal complexes, which are polymerized to form the precursor polymer. This embodiment has the advantage of guaranteeing that each unit of monomer will contain a metal atom. One disadvantage of this embodiment is that it does not produce high molecular weight precursor polymers.

High molecular weight precursor polymers are advantageous for use in a PIP process because high molecular weight precursor polymers tend to produce higher ceramic yields. Unfortunately, the viscosity of a polymer also increases with the molecular weight of the polymer. Precursor polymers with lower viscosity are preferred for an ideal PIP process. This inherent conflict may be resolved by using high molecular weight precursor polymers having relatively low viscosity, preferably a viscosity similar to a warm honey-like consistency. In order to produce such precursor polymers, the organo-transition metal complexes described above are polymerized with other comonomers which have low tendency to increase viscosity, as described in more detail below.

Preferred organometallics for use in this first embodiment include, but are not necessarily limited to metal coordinated substituted and unsubstituted allyl and vinyl organometallics comprising in the range of from about 2 to about 8 carbon atoms, preferably in the range of from about 2 to about 4 carbon atoms. Suitable allyl organometallics include, but are not necessarily limited to 1-methyl-2-propenyl magnesium chloride, 1-methyl-2-propenyl-magnesium bromide, 2-methyl-1-propenyl magnesium chloride, 1-methyl-2-propenyl-magnesium bromide, allyl magnesium chloride, allyl magnesium bromide. Suitable vinyl organometallics include, but are not necessarily limited to substituted and unsubstituted: vinyl lithium chlorides; vinyl magnesium chlorides; vinyl magnesium bromides; and similar compounds. Such compounds are available from Aldrich Chemical Co. A preferred organometallic is allyl magnesium bromide.

The organometallic should be reacted with a salt of a transition metal, defined herein as a transition metal selected from the group consisting of hafnium, tantalum, zirconium, titanium, vanadiun, niobium, chromium, molybdenum, and tungsten. Preferred transition metals are selected from the group consisting of tantalum, hafnium, and zirconium. Such salts include but are not necessarily limited to metal halides, metal nitrates, metal sulfates, and metal acetates, with preferred salts being hafnium and tantalum chloride. Hafnium and tantalum chloride, and other metal halides, are available from a number of chemical sources. For example, hafnium chloride is available from Advance Research Chemicals, Inc., Catoosa, Okla., and Teledyne Wah Cheng, Albany, Oreg. Hafnium boride is available from Noah Chemical, Div. Noah Technologies Corp., San Antonio, Tex. Hafnium bromide and tantalum bromide are available from Wilshire Chemical Co., InQ., Gardena, Calif. Tantalum chloride is available from several sources, including Aithaca Chemical Corp., Uniondale, N.Y. and Trinitech International, Inc., Twinsberg, Ohio.

In a preferred embodiment, hafnium or tantalum chloride is suspended in a suitable organic solvent, preferably dry ether, and chilled to a temperature in the range of from about $-70°$ C. to about $-90°$ C., preferably about $-78°$ C. An excess of organometallic is added over a period of about 5 minutes. The excess preferably should be a slightly more than a ratio based on the number of halogen atoms in the transition metal salt. For example, if the transition metal salt contains four chloride atoms, than an excess of organometallic of just over about 4:1 is preferred. If the salt contains five chloride atoms, than an excess of organometallic of just over about 5:1 is preferred, etc.

The resulting solution, which typically will have an orange (hafnium) or green (tantalum) color, is stirred under an inert gas besides nitrogen, preferably argon, for a time in the range of from about 10 to about 20 hours, preferably about 16 hours, and the product is isolated by filtration through a suitable medium, such as filter paper. In a preferred embodiment, using allyl magnesium bromide, the product is allyl hafnium or allyl tantalum, which converts to the respective carbide in substantially pure form upon pyrolysis.

If it is necessary to increase the molecular weight of the precursor polymer, comonomers may be copolymerized with the foregoing organo-transition metal complexes during the same reaction. Suitable comonomers include, but are not necessarily limited to styrene, vinyl and divinyl benzene, and alkadienes having a number of carbon atoms in the range of from about 4 to about 14.

In an alternate reaction, the "organic compounds" are boranes and carboranes, preferably ortho-deca-carboranes $(C_2B_{10}H_{12})$. The carboranes are polymerized by reaction with organometallic halides to form what is believed to be the following:

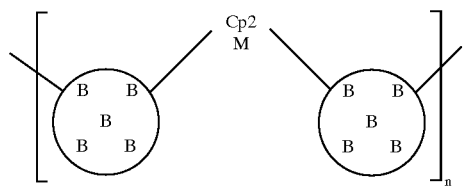

To prepare these precursor polymers, ortho-carborane, which may be obtained from Aldrich Chemical Co., should be lithiated, preferably by reaction with butyl lithium at about $-78°$ C. for a time in the range of from about 1 to about 3 hours. About 0.5 equivalents of a suitable organometallic halide, preferably bis(pentamethyl cyclopenta-dienyl) hafnium dichloride, should be added to the above prepared solution of the lithiated ortho-carborane at about $-78°$ C. and the solution should be slowly warmed to room temperature.

Other suitable commercially available boranes and carboranes include, but are not necessarily limited to meta-deca-carborane and closo-, nido-, arachno-, hypho-, and conjuncto-boranes, which could be deprotonated to the sodium, lithium, or potassium salt using techniques well known to persons of ordinary skill in the art. Boranes are widely commercially available, for example, from Aldrich Chemical Co. and from Fluka Chemical Co. Ortho-deca-carborane and meta-deca-carborane are commercially available from Aldrich Chemical Co.

Suitable ligands for the metal halide include, but are not necessarily limited to phosphines, amines, imines, sulfur-containing ligands, and cycloalkenyl groups. Preferred metal halides, which minimize the chance of adding impurity to the resulting borides, have the metal bound to at least one, preferably bound to two cycloalkenyl groups. Preferred cycloalkenyl groups are pentamethyl cyclopentadienyl groups.

Introduction of Organometallic Moieties into Preformed Polymers

In a second embodiment, organometallic moieties are immobilized on (or "grafted to") functional groups in a preformed backbone polymer. Suitable backbone polymers for use in this embodiment have repeated double bonds, and include, but are not necessarily limited to olefins, nitrites, acids, and ketones. In this embodiment, the molecular weight of the resulting precursor polymer is dictated by the molecular weight of the backbone polymer.

Suitable backbone polymers include a broad range of molecular weights, preferably in the range of from about 1500 to about 7000. In a preferred embodiment, the backbone polymers include, but are not necessarily limited to heteroatom free polyalkadienes, heteroatom free polystyrene polyalkadiene block copolymers (PSPB's), and isoprene polymers. Suitable PSPB's and polyalkadienes are widely commercially available. Suitable commercially available isoprene polymers include, but are not necessarily limited to polybutadiene-isoprene, poly(isoprene), and poly (isoprene-styrene), which are available from Polysciences, Inc. A preferred backbone polymer is polybutadiene, available from Phillips Chemical Co., Div. of Phillips Petroleum Co., Borger, Tex., and from E. L. Puskas Co., Akron, Ohio.

The backbone polymers possess alkene groups which are reactive to certain organometallic compounds, such as those containing metal hydride (M-H) functions. The alkene bond will react with a metal hydride, incorporating the metal into the backbone polymer. Substantially any hydride comprising a transition metal selected from the group consisting of hafnium, tantalum, zirconium, titanium, vanadium, niobium, chromium, molybdenum, and tungsten should work in the invention. Preferred hydrides comprise a metal selected from the group consisting of hafnium, tantalum, and zirconium.

Preferred organometallic hydrides for use in this embodiment are bis(pentamethylcyclo-pentadienyl) hafnium dihydride, which may be obtained from Strem Chemicals, Inc. and dicyclopentadienyl tantalum trihydride. Organohafnium and tantalum dihydrides may be made from the respective commercially available chlorinated compounds as illustrated in the following equations wherein "Cp*" stands for a pentamethyl cyclopentiadienyl compound:

$$Cp*_2HfCl_2 + 2BuLi \rightarrow Cp*_2Hf(Bu)_2$$

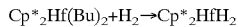

$$Cp*_2Hf(Bu)_2 + H_2 \rightarrow Cp*_2HfH_2$$

The Cp* hafnium dichloride and the lithiated butyl compound preferably should be mixed at a pressure of about 101.325 kPa (1 atm) and at a temperature in the range of from about −50° C. to about −90° C., preferably about −78° C. and stirred for a period of time in the range of from about 15 minutes to about 3 hours, preferably for about 2 hours. The chloride atoms in the Cp* hafnium dichloride will be substituted by the butyl groups from the lithiated butyl compounds, resulting in dibutyl Cp* hafnium. The butyl Cp* hafnium then should be mixed with hydrogen gas at ambient temperature (typically in the range of from about 20 to about 25° C.) and at ambient pressure (typically about 101.325 kPa or 1 atm) for a time period in the range of from about 10 hours to about 20 hours. The butyl groups will be substituted by hydrogen atoms to form dicyclopentadienyl hafnium dihydride.

To manufacture dicyclopentadienyl tantalum trihydride, tantalum (V) chloride is reacted with sodium Cp and sodium borohydride as follows:

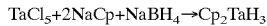

$$TaCl_5 + 2NaCp + NaBH_4 \rightarrow Cp_2TaH_3$$

Pure $Cp_2TaH_3$, which can be obtained by sublimation, may be reacted with the backbone polymer, such as polybutadiene, under refluxing conditions or under high temperature (about 200° C.) and high pressure (120 psi).

The foregoing reactions produce yellow or off-white precursor polymers, which are believed to have the following structure:

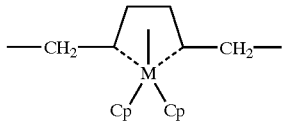

Pyrolysis of the off-white or yellow precursor polymers at between about 1200–1400° C. produces the respective metal carbide.

Polymer immobilized metal hydrides are sensitive to air and moisture and should be stored in an inert atmosphere, such as a dry-box, and transferred under a blanket of inert gas besides nitrogen, preferably argon.

Pyrolysis or Other Energy Treatment

The precursor polymers may be directly converted into high temperature coatings or the respective boride and/or carbide powders for use in making ceramic bodies, as fillers, etc.

In a preferred method, the precursor polymers are used to manufacture fiber-reinforced ceramic matrix composites (CMC's) using polymer infiltration/pyrolysis (PIP), as described in J. R. Strife, et al., *Ceram. Eng Sci. Proc.,* 1990, 11, pp. 871–919, incorporated herein by reference. Basically, a plurality of plies of a suitable fibrous or woven material, typically about 6–7 plies, are laid up for infiltration by the precursor polymer. Suitable fibrous or woven materials include, but are not necessarily limited to carbon fibers, alumina fibers, ceramic fibers, silicon carbide, other carbides and nitrides, and the like. The reinforcement material may be continuous fiber, chopped fiber, woven cloth, or matted material. The precursor polymer is simply applied to the top of the stack of plies and allowed to infiltrate into the material. The infiltration should occur at ambient conditions; however, the assembly may be autoclaved to increase the speed of polymer curing, if desired.

After the precursor polymer has infiltrated the stack of plies and the stack has been autoclaved at a temperature of approximately 200° C. for about 2 hours or less, the entire assembly should be exposed to energy sufficient to decompose the precursor polymer. Preferably, the assembly is subjected to pyrolysis at a temperature in the range of from about 800° C. to about 1600° C., preferably about 1400° C. The pyrolysis preferably should take place under substantially any inert gas besides nitrogen, preferably argon due to its cost effectiveness. Although carbides and borides begin to form at about 800° C., a temperature of about 1400° C. is preferred because higher crystallinity is observed at about 1400° C. These temperatures are sufficiently high to pyrolize the precursor polymers, but also sufficiently low to avoid disintegrating the plies or the fiber reinforcement material. The fibers remain substantially intact, resulting in a composite structure having greater strength than a composite pyrolyzed at temperatures greater than about 1400° C.

The precursor polymer decomposes to a refractory metal carbide or a refractory metal boride comprising no more than "trace impurities." The term "trace impurities" is defined herein as the minimum amount of impurities detectable by X-ray diffraction analysis. Quantitatively, the amount of impurities preferably is less than about 3 wt %, most preferably less than about 2 wt %.

The foregoing synthesis procedures are sufficiently flexible to provide a range of precursor polymers having a range of viscosities suitable for PIP, as well as a range of CMC's formed using metal carbides and metal borides produced from such precursor polymers. If desired, fine ceramic, metal, alloy, polymer, and/or clay powder could be added to the precursor polymer prior to PIP or other energy treatment to provide a wider range of product stoichiometry and greater process flexibility. The refractory metal carbides and metal borides should provide increased oxidation resistance.

The invention will be better understood with reference to the following examples, which are illustrative only, and should not be construed as limiting the present invention:

EXAMPLE I

Hafnium chloride (6.6 g, 20.6 mmol) was suspended in 500 mL of dry ether and chilled to −78° C. 84 mL (84 mmol) of 1 M allyl magnesium bromide was added dropwise over a period of 5 minutes. The orange solution was stirred under argon overnight and then filtered. The solvent was removed under vacuum and 0.98 g of the residue was fired at 1400° C. with an argon purge. The resulting char weighed 0.19 g (19% ceramic yield). The powder x-ray diffraction (XRD) trace indicated that the char was mostly hafnium carbide with only a trace impurity of magnesium oxide.

EXAMPLE II

Tantalum chloride (5.0 g, 14 mmol) was suspended in 100 mL of ether chilled to −78° C. and 70 mL of 1M allyl magnesium bromide was added over a period of 5 minutes. The dark green solution was stirred at −78° C. under an argon blanket overnight and then filtered. The solvent was removed by vacuum and 0.99 g of the residue fired at 1400° C. with an argon purge. The resulting char weighed 0.19 g (19% ceramic yield). The powder XRD trace of the char indicated that the product was purely tantalum carbide.

EXAMPLE III

Bis(pentamethyl cyclopentadienyl) hafnium dihydride was prepared as described in D. M. Roddick, et al, *Organometallics* 4 (1985) 97–104, incorporated herein by reference. 0.69 g of the bis(pentamethyl cyclopentadienyl) hafnium dihydride was dissolved in 20 mL of dry toluene and 0.1 g of polybutadiene (MW=3,000) was added. The solution was stirred for 24 hours at room temperature under an argon atmosphere. The solvent was removed by vacuum leaving an orange solid. A 0.63 g sample of the residue was fired at 1400° C., yielding 0.25 g of a black char (39.7% ceramic yield). Powder XRD analysis of the char indicated a mixture of hafnium carbide and a small impurity of various hafnium oxide phases.

Bis(pentamethyl cyclopentadienyl) hafnium dihydride was dissolved in 20 mL of dry toluene and 0.12 g of polybutadiene (MW=1800) was added. The solution was stirred overnight under argon atmosphere. The solvent was removed by vacuum and 0.51 g of the residue was fired at 1400° C., yielding 0.13 g of char (25.5% ceramic yield). The XRD trace of the gray char material indicated largely hafnium carbide with a significant hafnium oxide phase.

EXAMPLE IV 1.0 g of $Cp_2TaH_3$ was dissolved in 35 ml of 1,2-dimethoxyethane. 15 ml of polybutadiene (MW 3000) was added. The mixture was refluxed for 16 hours. The mixture was cooled to room temperature and the solvent was evaporated under vacuum to produce a yellow polymer. The polymer was heated to 1400° C. for 1 hour to obtain pure TaC at a 25% ceramic yield.

EXAMPLE V 14 mmoles of ortho-carborane was dissolved in 120 mL of dry ether which was cooled to −78° C., to which 14 mmoles of methyllithium was added. The mixture was stirred at −78° C. for two hours and thereafter warmed to room temperature. A solution of 7 mmoles of $Cp*_2HfCl_2$ in 50 mL of toluene was added. The mixture was stirred at room temperature for 40 hours. After filtration, the solvent was evaporated, producing a yellow tacky polymer. When heated to 1400° C., the polymer produced pure hafnium boride in a 38% ceramic yield.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A method for making a ceramic matrix composite comprising:
    forming an infiltrated fiber reinforcement by infiltrating a plurality of plies of a fibrous material with a precursor polymer selected from the group consisting of polymerized organo-transition metal complexes selected from the group consisting of transition metal coordinated olefinic groups, selected from the group consisting of ally groups, vinyl groups, and olefinic groups comprising from about 2 to about 8 carbon atoms, molecules selected from the group consisting of boranes, carboranes, and combinations thereof bonded together via an organometallic moiety comprising a transition metal and a ligand, said molecules being selected from the group consisting of ortho-deca-carboranes, meta-deca-carboranes, closo-boranes, nido-boranes, arachno-boranes, hyphoboranes, conjuncto-boranes, and combinations thereof, and organometallic hydrides comprising a transition metal immobilized on a plurality of unsaturated bonds in a backbone polymer; and
    exposing said infiltrated fiber reinforcement to conditions effective to cure said precursor polymer and to decompose said precursor polymer to a product selected from the group consisting of a refractory metal boride and a refractory metal carbide, said product comprising about 3 wt. % impurities or less.

2. The method of claim 1 wherein said transition metal is selected from the group consisting of hafnium, tantalum, and zirconium.

3. The method of claim 2 wherein
    said precursor polymer comprises polymerized organo-transition metal complexes; and
    said organo-transition metal complexes are selected from the group consisting of allyl hafnium or allyl tantalum.

4. The method of claim 3 wherein said conditions comprise
    preheating said infiltrated fiber reinforcement in an inert gas other than nitrogen to a temperature effective to cure said precursor polymer; and
    subjecting said infiltrated fiber reinforcement to pyrolysis at a temperature sufficient to decompose said precursor polymer to said product selected from the group consisting of said refractory metal boride and said refractory metal carbide.

5. The method of claim 2 wherein
    said precursor polymer comprises organometallic hydrides immobilized on a plurality of double bonds in a backbone polymer; and,
    said organometallic hydrides are selected from the group consisting of bis(pentamethylcyclo-pentadienyl) hafnium dihydride and dicyclopentadienyl tantalum trihydride.

6. The method of claim 5 wherein said conditions comprise
    preheating said infiltrated fiber reinforcement in an inert gas other than nitrogen to a temperature effective to cure said precursor polymer; and
    subjecting said infiltrated fiber reinforcement to pyrolysis at a temperature sufficient to decompose said precursor polymer to said product selected from the group consisting of said refractory metal boride and said refractory metal carbide.

7. The method of claim 2 wherein
    said precursor polymer comprises ortho-deca-carborane; and,
    said organo-transition metal moiety comprises said transition metal bound to at least one cycloalkenyl group.

8. The method of claim 7 wherein said transition metal is bound to at least one pentamethyl cyclopentadienyl group.

9. The method of claim 7 wherein said transition metal is bound to two pentamethyl cyclopentadienyl groups.

10. The method of claim 2 wherein said conditions comprise
   preheating said infiltrated fiber reinforcement in an inert gas other than nitrogen to a temperature effective to cure said precursor polymer; and
   subjecting said infiltrated fiber reinforcement to pyrolysis at a temperature sufficient to decompose said precursor polymer to said product selected from the group consisting of said refractory metal boride and said refractory metal carbide.

11. The method of claim 1 wherein said transition metal is selected from the group consisting of hafnium and tantalum.

12. The method of claim 11 wherein said precursor polymer comprises
   components selected from the group consisting of ortho-deca-carborane, meta-deca-carborane, closo-borane, nido-borane, arachno-borane, hypho-borane, and conjuncto-borane; and
   said organo-transition metal moeity comprises a ligand selected from the group consisting of a phosphine, an amine, an imine, a sulfur-containing ligand, and a cycloalkenyl group.

13. The method of claim 12 wherein said conditions comprise
   preheating said infiltrated fiber reinforcement in an inert gas other than nitrogen to a temperature effective to cure said precursor polymer; and
   subjecting said infiltrated fiber reinforcement to pyrolysis at a temperature sufficient to decompose said precursor polymer to said product selected from the group consisting of said refractory metal boride and said refractory metal carbide.

14. The method of claim 1 wherein said conditions comprise
   preheating said infiltrated fiber reinforcement in an inert gas other than nitrogen to a temperature effective to cure said precursor polymer; and
   subjecting said infiltrated fiber reinforcement to pyrolysis at a temperature sufficient to decompose said precursor polymer to said product selected from the group consisting of said refractory metal boride and said refractory metal carbide.

15. The method of claim 1 wherein said product comprises no more than trace impurities.

16. The method of claim 1 wherein said product comprises about 2 wt. % impurities or less.

17. The method of claim 1 wherein said fibrous material comprises a woven fibrous cloth.

18. The method of claim 1 wherein said fibrous material comprises continuous fibers.

19. The method of claim 1 wherein said fibrous material comprises a matted fibrous material.

20. The method of claim 1 wherein said fibrous material comprises chopped fibers.

21. A method for making a ceramic matrix composite comprising:
   forming an infiltrated fiber reinforcement by infiltrating a plurality of plies of a fibrous material with a precursor polymer; and
   exposing said infiltrated fiber reinforcement to conditions effective to cure said precursor polymer and to decompose said precursor polymer to a product selected from the group consisting of a refractory metal carbide and a refractory metal boride comprising about 3 wt. % impurities or less;
   wherein said precursor polymer is made by a method comprising mixing a transition metal compound with an organic compound under conditions effective to form organo-transition metal complexes, wherein said organic compound is selected from the group consisting of an organometallic compound comprising a second metal which is displaceable by said transition metal, said second metal being bonded to at least one polymerizable organic component selected from the group consisting of allyl groups, vinyl groups, and olefinic groups comprising from about 2 to about 8 carbon atoms, boron containing complexes comprising molecules bound together via organometallic moieties comprising a ligand and a second metal which is displaceable by said transition metal, wherein said molecules are selected from the group consisting of ortho-deca-carboranes, meta-deca-carboranes, closo-boranes, nido-boranes, arachno-boranes, hyphoboranes, conjuncto-boranes, and combinations thereof, and a backbone polymer comprising a plurality of unsaturated bonds; and
   wherein, when said organic compound is said boron-containing complexes, said transition metal compound comprises an organo-transition metal halide; and when said organic compound is selected from the group consisting of said organometallic compound, said boron-containing complexes, said organo-transition metal complexes are subjected to conditions effective to polymerize said organo-transition metal complexes and to form said precursor polymers.

22. The method of claim 21 wherein said precursor polymers are made by a method comprising:
   mixing a salt of a transition metal with an organometallic compound comprising a second metal which is displaceable by said transition metal, said second metal being bonded to at least one polymerizable organic component selected from the group consisting of allyl groups, vinyl groups, and olefinic groups comprising from about 2 to about 8 carbon atoms under conditions effective to form organo-transition metal complexes; and
   subjecting said organo-transition metal complexes to conditions effective to polymerize said organo-transition metal complexes, forming said precursor polymer.

23. The method of claim 21 wherein said second metal is selected from the group consisting of magnesium and lithium.

24. The method of claim 21 wherein said organometallic compound comprises a metal selected from the group consisting of magnesium and lithium.

25. The method of claim 21 wherein said transition metal compound comprises a metal halide.

26. The method of claim 21 wherein said product comprises trace impurities.

27. The method of claim 21 wherein said product comprises about 2 wt. % impurities or less.

28. A method for making a ceramic matrix composite comprising:
   forming an infiltrated fiber reinforcement by infiltrating a plurality of plies of a fibrous material with a precursor polymer; and
   exposing said infiltrated fiber reinforcement to conditions effective to cure said precursor polymer and to decompose said precursor polymer to a product selected from the group consisting of a metal carbide and a metal boride, said product comprising about 3 wt. % impurities or less;

wherein said precursor polymer is made by a method comprising mixing an organo-transition metal halide comprising an organo-transition metal moeity with an organic compound selected from the group consisting of a borane and a carborane under conditions effective to form a precursor polymer comprising a plurality of units of said organic compound bound together via said organo-transition metal moiety.

29. The method of claim 28 wherein said organic compound is selected from the group consisting of ortho-deca-carborane, meta-deca-carborane, closo-borane, nido-borane, arachno-borane, hypho-borane, and conjuncto-borane; and said organo-transition metal halide comprises a ligand selected from the group consisting of a phosphine, an amine, an imine, a sulfur-containing ligand, and a cycloalkenyl group.

30. The method of claim 28 wherein said organic compound comprises ortho-deca-carborane; and said organo-transition metal halide is selected from the group consisting of bis(pentamethylcyclo-pentadienyl) hafnium dichloride and dicyclopentadienyl tantalum dichloride.

31. The method of claim 28 wherein said product comprises trace impurities.

32. The method of claim 28 wherein said product comprises about 2 wt. % impurities or less.

33. A method for making a ceramic matrix composite comprising:

forming an infiltrated fiber reinforcement by infiltrating a plurality of plies of a fibrous material with a precursor polymer; and exposing said infiltrated fiber reinforcement to conditions effective to cure said precursor polymer and to decompose said precursor polymer to a product selected from the group consisting of a metal carbide and a metal boride, said product comprising about 3 wt. % impurities or less;

wherein said precursor polymer is made by a method comprising mixing a transition metal compound with a backbone polymer comprising a plurality of double bonds under conditions effective to complex said transition metal compound with said double bonds in said backbone polymer, forming said precursor polymer.

34. The method of claim 33 wherein said precursor polymer comprises an olefin.

35. The method of claim 33 wherein said backbone polymer
is selected from the group consisting of polyalkadienes, polystyrene polyalkadiene block copolymers, and isoprene polymers.

36. The method of claim 33 wherein said backbone polymer is selected from the group consisting of a polybutadiene, a polystyrene, an isoprene, a block copolymer of a polybutadiene and a polystyrene, and a block copolymer of a polybutadiene and an isoprene.

37. The method of claim 33 wherein said ligand comprises at least one cycloalkenyl group.

38. The method of claim 33 wherein said transition metal compound comprises a transition metal selected from the group consisting of hafnium, tantalum, and zirconium.

39. The method of claim 33 wherein said product comprises trace impurities.

40. The method of claim 33 wherein said product comprises about 2 wt. % impurities or less.

* * * * *